United States Patent [19]

Gennesseaux

[11] Patent Number: 5,411,243
[45] Date of Patent: May 2, 1995

[54] HYDRAULIC ANTIVIBRATION DEVICES

[75] Inventor: André Gennesseaux, Chateaudun, France

[73] Assignee: Hutchison, Paris, France

[21] Appl. No.: 195,144

[22] Filed: Feb. 14, 1994

[30] Foreign Application Priority Data

Feb. 12, 1993 [FR] France ............... 93 01605

[51] Int. Cl.⁶ ............................................. F16F 9/34
[52] U.S. Cl. ............... 267/140.14; 188/322.13; 248/562; 248/636
[58] Field of Search ........... 180/300; 188/299, 322.13, 188/322.14, 322.15; 248/562, 563, 636; 267/64.13, 113, 140.11–140.15

[56] References Cited

U.S. PATENT DOCUMENTS

| 2,950,088 | 8/1960 | Scott ............................. 173/200 |
| 4,648,576 | 3/1987 | Matsui ............................. 248/550 |
| 4,699,099 | 10/1987 | Arai et al. ................. 267/140.14 X |
| 4,789,143 | 12/1988 | Smith et al. ................. 267/140.14 |
| 4,869,478 | 9/1989 | Bouhours et al. ........... 267/140.13 |
| 5,031,884 | 7/1991 | Baudrit et al. .............. 267/140.14 |
| 5,165,668 | 11/1992 | Gennesseaux .............. 267/140.15 |
| 5,246,213 | 9/1993 | Zup et al. .................... 267/140.14 |

FOREIGN PATENT DOCUMENTS

| 3218181 | 11/1983 | Germany . |
| 3508823 | 9/1986 | Germany . |
| 3743555 | 7/1989 | Germany ............... 267/140.12 |
| 2046337 | 2/1990 | Japan ..................... 267/140.13 |
| 5223139 | 8/1993 | Japan ..................... 267/140.14 |
| 1097715 | 1/1968 | United Kingdom . |
| 2086660 | 5/1982 | United Kingdom . |
| 9100641 | 1/1991 | WIPO . |

OTHER PUBLICATIONS

Patent Abstracts of Japan, vol. 6, No. 32, 26 Feb. 1982 & JP-A-56150806 21 Nov. 1981.

Primary Examiner—Robert J. Oberleitner
Assistant Examiner—Alfred Muratori
Attorney, Agent, or Firm—Larson and Taylor

[57] ABSTRACT

A hydraulic antivibration device comprises, between its two chambers, two passages (8, 10) connected in parallel, and it also comprises a rotary shutter (11) having the same axis (X) as the device and suitable for opening or closing, at will, at least one of the two passages and also slots that put the chambers into communication with a decoupling shutter member. Angular displacement of the shutter is controlled by successively exciting two small antagonistic electromagnets (14, 15) housed in the outer portion of the intermediate partition (7) and suitable for attracting a ferromagnetic armature (16) of the shutter member, which armature is urged towards an intermediate position by a small spring (17).

8 Claims, 2 Drawing Sheets

HYDRAULIC ANTIVIBRATION DEVICES

The invention relates to hydraulic antivibration devices designed to be interposed for damping, connection and even support purposes between two rigid elements such as a vehicle chassis and the engine of the vehicle.

More particularly, amongst such devices, the invention relates to a device comprising:

a rigid strength member that is annular about a generally vertical or substantially vertical axis X, and a rigid stud coaxial with said strength member, the member and the stud being suitable for connection to respective ones of the two rigid elements to be interconnected;

an annular elastomer wall about the axis X and capable of withstanding axial compression interposed between the strength member and the stud;

a flexible and liquid-tight bellows carried by the strength member and co-operating with the strength member, the stud, and the annular wall to define an enclosure;

a rigid intermediate partition carried by the strength member and subdividing the inside of the enclosure into two chambers, a working chamber adjacent to the wall, and a compensation chamber adjacent to the bellows;

a passage putting the two chambers into communication with each other; and a mass of liquid filling the two chambers and the passage.

As is known, with such a device, the application of oscillations of relatively large amplitude (generally greater than 0.5 mm) and of relatively low frequency (generally of the order of 1 Hz to 40 Hz) to one of the strength members in the X-direction has the effect of displacing the liquid from one of the two chambers into the other, and vice versa, through the constricted passage, with the mass of liquid displaced in this way coming into resonance when the frequency of said oscillations reaches a predetermined value $F_0$ which is a function of the ratio between the right cross-section and the axial length of the constricted passage, said resonance providing excellent damping of the oscillations concerned.

If the frequency of the oscillations imposed between the two strength members differs from the optimum value $F_0$, then the oscillations are damped less well than oscillations at the frequency $F_0$.

In certain applications, it is appropriate to obtain good damping at two distinct values $F_0$ and $F_1$, both of relatively low frequency, with the first of said values being of the order of 10 Hz, for example, and the second of the order of 25 Hz to 30 Hz. This applies when the oscillation-generating phenomena to be accommodated are respectively "choppiness" where the vehicle is shaken by running over rough ground (in which case it is desirable to provide maximum damping of the oscillations in the vehicle chassis due to the shaking or shocks imparted to the engine), and vibrations due to the engine idling when the vehicle is stationary, which vibrations should be isolated as much as possible from the chassis.

In order to obtain effective control of either of two distinct oscillatory phenomena of the same kind as those mentioned above, proposals have already been made for causing the damping devices in question to be "adaptative", with this being done by mounting a second passage in parallel with the said passage of such a device, the second passage likewise being suitable for interconnecting the two chambers, but being of dimensions that are different from those of the first passage, a shutter being provided that is capable of rotating about the axis X of the device and that is suitable for opening or closing said second passage at will, in particular as a function of whether the vehicle is stationary or in motion.

In the embodiments that have been proposed for this purpose so far, provision has already been made for such a rotary shutter to be mounted and driven so that no torque is exerted thereon by the hydraulic pressure.

However, in the solutions adopted (see in particular French patents FR-2 574 031 and FR-2 610 054), the means for driving the shutter (circularly symmetrical electromagnet about the axis X or an electric motor about the axis X) are relatively bulky, such that the resulting damping devices cannot be used instead of and in the positions of conventional devices of the same kind, i.e. devices that have a single passage which is permanently open.

In other words, with known solutions, if it is desired for a conventional type of hydraulic antivibration device to be made "adaptative", e.g. in order to enable it successively to provide optimum damping of choppiness while a vehicle is in motion, followed by optimum isolation of engine-idling vibration while the vehicle is stationary, then it is necessary for the device to be over-dimensioned.

It is then no longer possible to use ordinary tools for manufacturing and mounting such devices, and above all such devices cannot be received in the accurately dimensioned spaces left available between the chassis and the engine for the corresponding conventional devices.

It is also known to include a floating valve member (or membrane) in hydraulic antivibration devices of the kind in question, the valve member being mounted so as to be capable of vibrating with limited amplitude, generally less than 1 mm, and to have one of its faces in communication with the working chamber (see above-mentioned French patent FR-2 574 031).

The use of such a valve member which provides decoupling for relatively high frequency vibration such as that generated by operation of the vehicle engine, is particularly advantageous when the device is in use for damping relatively low frequency oscillations (choppiness).

However it is of no advantage, and may even turn out to be a disadvantage, when the device is operating so as to isolate higher frequency vibration (engine idling).

A particular object of the invention is to remedy the various drawbacks mentioned above, and more precisely:

to make conventional antivibration devices of the kind in question "adaptative" without increasing their outside dimensions in any way; and to enable such devices to benefit automatically from a "high frequency decoupling" effect even while performing low frequency damping (choppiness), with said effect being, in contrast, automatically suppressed when isolating at a higher frequency (engine idling).

To this end, according to the invention, a hydraulic antivibration device of the kind in question still comprises a shutter that is rotary about the axis X of the device and that is suitable for opening or closing at will at least the passage of larger section, a tab of ferromagnetic material that forms a portion of the rotary shutter and that is eccentric relative to the axis X, electromagnetic means housed in the periphery of the rigid intermediate partition and disposed to act angularly on the tab in one direction about the axis X, resilient means urging said tab angularly in the opposite direction, and slots formed through the rotary shutter and suitable for co-operating with slots formed through the intermediate partition in such a manner as to put both chambers into communication with a decoupling valve member centered on the axis X and mounted to move within the intermediate partition, and the antivibration device is essentially characterized in that the electromagnetic means comprise two small electromagnets that are eccentric relative to the axis X, and two magnetic circuits that are looped by the tab via two respective gaps disposed angularly on either side of said tab, in that the resilient means are disposed to urge the tab constantly towards a middle angular position in which the widths of the two gaps are equal, and in that the slots formed through the shutter are disposed in such a manner that the above communication with the decoupling valve member is established while the larger section constricted passage is closed, and, on the contrary, is interrupted when said passage is opened.

In advantageous embodiments, use is made of one or more of the following dispositions:

the annular wall is generally frustoconical in appearance;

the two electromagnets are angularly juxtaposed one against the other with an interposed plate of ferromagnetic material, and the end of each electromagnet furthest from the other electromagnet is juxtaposed with a respective end plate of ferromagnetic material that overhangs slightly in such a manner that the assembly comprising the electromagnets and the plates forms a U-shape encompassing the tab, the gaps being located between said tab and the legs of the U-shape as embodied by the overhanging portions of the end plates;

the rotary shutter is a disk that is extended at its periphery by a cylindrical rim including at least one shutter member suitable for moving past the opening of one of the constricted passages hollowed out in the periphery of the intermediate partition, and the tab of ferromagnetic material is constituted by a cylindrically arcuate portion fitted to the edge of the disk;

the rotary shutter is a disk having at least one slot formed therein suitable for passing over the opening of one of the constricted passages, and the tab of ferromagnetic material is a flat radial extension of said disk in the form of a circular section;

the angular extent of the tab of any one of the three preceding paragraphs lies in the range 60° to 90°;

the set of electromagnetic means is located between two circular cylinders about the axis X having respective diameters lying in the range 40 mm to 80 mm and in the range 80 mm to 120 mm; and the coils of the two electromagnets are connected in series with respective rectifiers and they are fed with electricity from a DC source via a double reversing switch.

In addition to the above main dispositions, the invention includes certain other dispositions that are preferably used simultaneously therewith and that are described in greater detail below.

Various preferred embodiments of the invention are described below with reference to the accompanying drawings, with the description naturally being non-limiting.

FIGS. 1 and 2 of the drawings are respectively an axial section on I—I of FIG. 2 and a cross-section on II—II of FIG. 1 showing a hydraulic antivibration device implemented in accordance with the invention.

Figure 1:
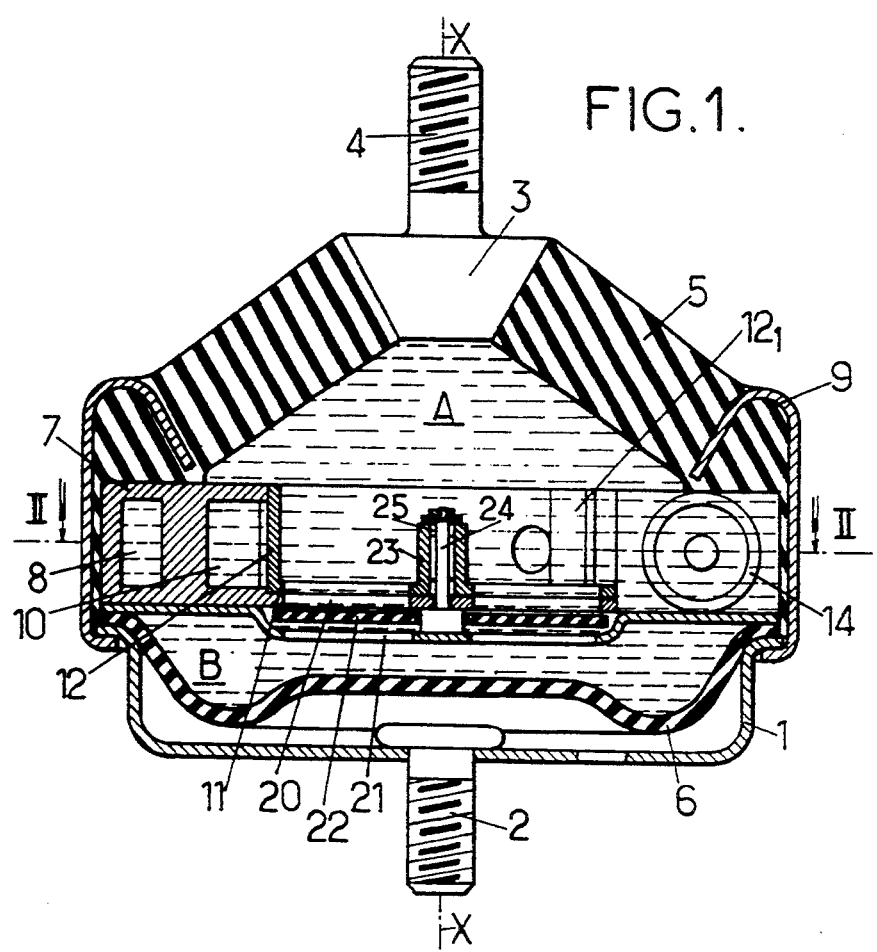

In conventional manner, the hydraulic antivibration device always includes:

a rigid circular cup 1 having a vertical axis X fitted with a fixing bolt 2 ready for use and directed downwards;

a rigid stud 3 coaxial with the cup 1 and fitted with a fixing bolt 4 ready for use and directed upwards;

an elastomer wall 5 that is annular about the axis X, that is generally frustoconical in appearance, and that withstands axial compression, interposed between the cup 1 and the stud 3;

a flexible and liquid-tight circular bellows 6 whose edge is secured to the edge of the cup 1 and which cooperates with said edge, the annular wall 5, and the stud 3 to define an enclosure;

an intermediate rigid partition 7 whose periphery is also bonded to the edge of the cup 1 and which subdivides the inside of the above enclosure into two chambers, a working chamber A adjacent to the wall 5, and a compensation chamber B adjacent to the bellows 6;

a constricted passage 8 putting the two chambers A and B into communication with each other; and a mass of liquid filling the two chambers A and B and also filling the constricted passage 8.

The fixing members 2 and 4 are designed to secure the cup 1 and the stud 3 with the respective rigid elements or assemblies between which it is desired to have a damping support or guide: in particular these may be the chassis of a vehicle and the internal combustion engine of the vehicle.

Mutual liquid-tight assembly between the large base of the elastomer annular wall 5, the edge of the intermediate partition 7, and the edge of the bellows 6 on a horizontally outwardly directed edge of the cup 1 is implemented by crimping the bottom edge of a metal ferule 9 whose top edge is curved and folded inwardly and downwardly and is embedded in said large base.

The constricted channel 8 is hollowed out in the periphery of the intermediate partition 7 and comprises a circularly arcuate length occupying a little more than 180° (see FIG. 2) together with radial end couplings.

The device in question is also caused to include a second constricted passage 10 connected in parallel with the constricted passage 8 (referred to below as the "first passage") and likewise interconnecting the two chambers A and B.

The second passage 10 is constituted in this case by two portions of identical section and length connected in parallel with each other, with each of said portions being both larger in section and shorter in length than the passage 8.

Given the above choice of dimensions:

using the first constricted passage 8 on its own to interconnect the chambers A and B enables the device to damp oscillations at a relatively low frequency $F_0$, such as oscillations produced by choppiness as explained above; and using the second constricted passage 10 on its own to interconnect the two chambers A and B (or using both passages 8 and 10 simultaneously which has substantially the same effect) enables the device to isolate vibrations corresponding to a frequency $F_1$ that is still low, but that is a little higher than the previous frequency $F_0$, e.g. an engine idling frequency as explained above.

To adapt the support device to the first mode of operation, it suffices merely to close the second constricted passage 10 while leaving the first passage 8 open, and to adapt it to the second mode, it suffices to open the second passage 10, during which time the first passage 8 may be either opened or closed.

In other words, to switch between the two above-described modes of operation, it suffices merely to close or open the second constricted passage 10.

To this end, use is made of a shutter 11 capable of rotating about the axis X and organized so as to be capable of moving within the liquid under a minimum amount of driving force.

Figure 2:
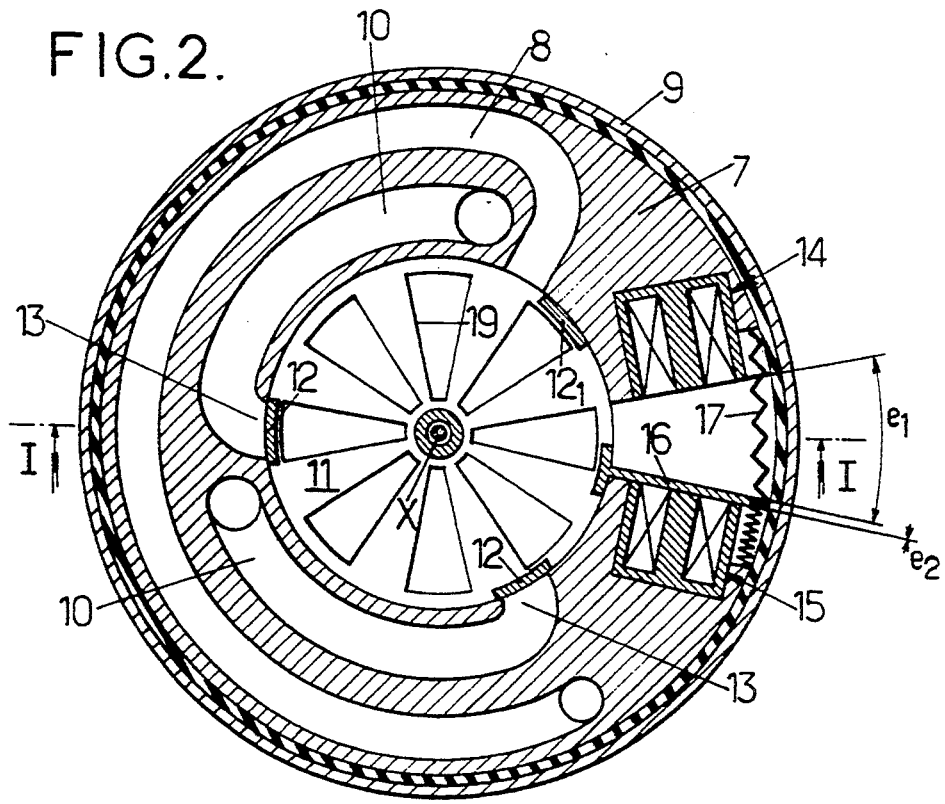
Figure 4:
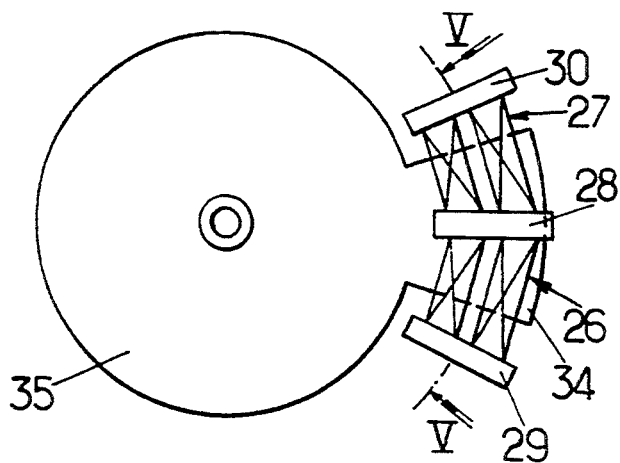
FIG. 4 shows another variant of FIG. 3, similarly implemented in accordance with the invention.

In particular, the portion 12 of said shutter 11 that is designed to overlie the controlled opening 13 of the second constricted passage 10 is shaped in such a manner that the liquid pressure exerted thereon imparts no torque on the shutter, said pressure being directed either towards the axis X (as shown in FIGS. 1 and 2) or else parallel to said axis (as shown in FIG. 4).

Means are also provided for controlling rotation of the shutter 11, preferably automatically.

The present invention relates essentially to these drive means, and one of the main objects of the invention is to reduce the size thereof to such an extent as to enable them to be fully contained within the outside dimensions that are usual for comparable devices that include a single, permanently-open constricted passage.

To this end, said drive means for the rotary shutter are caused to include a pair of electromagnets instead of a single solenoid about the axis X as in certain known devices, said two electromagnets being disposed to urge an eccentric magnetic member secured to the shutter angularly in two opposite directions, with this being done on either side of a neutral mean position towards which said magnetic member is constantly urged by suitable resilient means.

Such use of two electromagnets is, a priori, surprising since, in the context of reducing the overall size of such an "adaptive" device, it would appear to be more appropriate to use a single electromagnet rather than two.

The explanation for such a measure is as follows.

The force/current characteristic of an electromagnet is far from being a linear characteristic.

If the attraction force exerted by an electromagnet on a magnetic part or member located at a distance d from its front face is written f, and if the electrical current feeding the electromagnet is written i, then said force f is proportional to $(i/d)^2$.

In the present case, the DC power supply voltage, which in particular is the 12 volts from the battery of the vehicle in question, is constant and as a result so is the current i.

Under such circumstances, the force f is inversely proportional to the square of the distance d.

Therefore, if a single electromagnet is used to control displacement of a magnetic member through a given distance against the return force of a spring, then that single electromagnet must be dimensioned so as to be capable of exerting its force of attraction even at the maximum separation distance of the magnetic member to be attracted: the resulting electromagnet is therefore very bulky.

However, if two electromagnets are used, each of them can be extremely small since the force of attraction that it needs to generate corresponds to a stroke of the magnetic member that is half that required in the preceding case, so the force is one-fourth the preceding force.

It should also be observed that there is no need to overcome a large resilient return force in this case since, in this case, it is necessary solely to urge the magnetic member resiliently towards a neutral mean position, with each of the electromagnets being de-excited when the other is excited.

In the embodiment shown in FIGS. 1 and 2, the two electromagnets in question are given references 14 and 15.

Both of them are located in the peripheral portion of the intermediate partition 7 and they are disposed angularly on either side of a magnetic armature 16 of ferromagnetic material secured to the shutter 11 and extending it outwardly, thereby defining two gaps $e_1$ and $e_2$ disposed angularly on either side of said magnetic armature.

The magnetic armature 16 is urged resiliently towards its rest position located halfway between the two electromagnets 14 and 15 by means of a small helical traction spring 17: as can clearly be seen in FIG. 2, the midpoint of the spring 17 is secured to said magnetic armature 16 while its two ends are secured to two respective points of the rigid partition 7.

The above-described "adaptative" device operates as follows.

At rest, i.e. so long as the electrical circuits of the vehicle in question have not been switched on, the magnetic armature 16 lies in its middle angular position into which it is urged by the relatively low return force of the spring 17.

Once the engine has started, the electromagnet 14 is excited on its own, and the magnetic armature 16 is attracted thereto and pressed thereagainst.

Under such circumstances, the shutter 11 opens the second constricted channel 10 and may optionally also close the first constricted passage 8, even though that is not essential.

Under such circumstances, it is engine idling vibration that is damped in optimum manner.

If the vehicle is then set into motion, there is no longer any need to damp vibration due to the engine idling, but there may be need to damp oscillations due to choppiness.

Electrical excitation of the electromagnet 14 is then automatically switched off and applies instead to the electromagnet 15.

The magnetic armature 16 is then returned initially to its middle position by force coming from the return spring 17, and it is only from said middle position that it is attracted by the magnetic force of the electromagnet 15 and is pressed thereagainst, as shown in FIG. 2.

The second constricted passage 10 is then closed by the shutters 12 whereas the constricted passage 8 is completely disengaged.

The device then provides optimum damping for the above-mentioned oscillations due to choppiness.

As can also be seen in FIGS. 1 and 2, when the rotary shutter 11 is in its position that corresponds to the above mode of operation, fan-shaped slots 19 or sectors of a circle opened out through the shutter 11 are then in correspondence with identical slots 20 and 21 formed through a pair of plates constituting the central portion of the intermediate partition 7, which pair of plates contain a floating washer or valve member 22 suitable in conventional manner for achieving a decoupling effect for relatively high frequency vibration generated by operation of the vehicle engine.

In contrast, said decoupling valve member 22 is completely isolated by the slots 20 being closed by the shutter 11 during the first mode of operation as described above (isolation relative to vibration due to the engine idling).

After each period of motion, when the vehicle is stopped again, the excitation of the two electromagnets 14 and 15 is observed to switch over from the previous excitation configuration: in other words, the electromagnet 14 is excited again and the electromagnet 15 is de-excited, the magnetic armature 16 is pressed against said electromagnet 14, and the device operates again to isolate the vehicle chassis from vibration due to the engine idling.

The above-mentioned excitation switchover may be performed automatically, e.g. under control of variations in a parameter responsive to the speed of the vehicle and provided by an appropriate tachometer device.

As can be seen in FIGS. 1 and 2:

the rotary shutter 11 is in the form of a disk perforated by the openings 19 and extended at its periphery by cylindrical arcs extending parallel to the axis X and constituting shutter members 12;

one of said shutter members, given reference $12_1$, is used for closing off the first constricted passage 8 when the shutter 11 is in the angular position that corresponds to the second constricted passage 10 being open; and the center of the disk 11 includes a sleeve 23 mounted via rings 24 of low coefficient of friction, e.g. polytetrafluoroethylene rings, to pivot about a central pin 25 having axis X and secured to the center of the intermediate partition 7.

Since the magnetic armature 16 is required to move within a mass of liquid, it should be given a shape such that the volumes of liquid displaced by displacements of the magnetic armature are relatively small.

Figure 3:
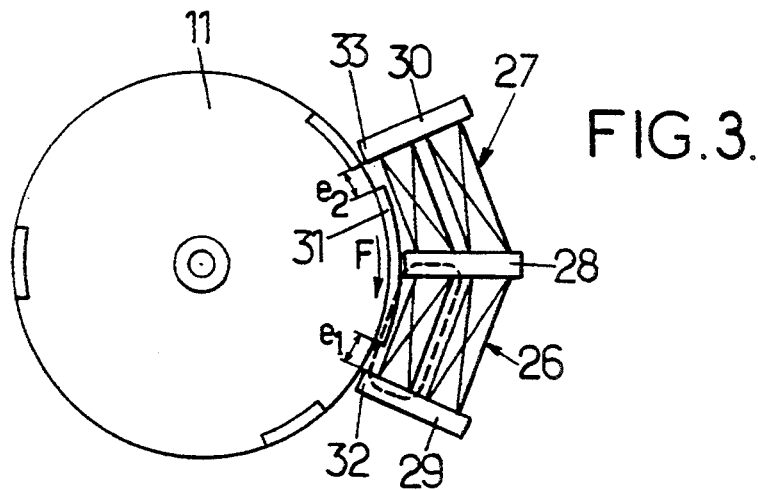
FIG. 3 is a fragmentary diagrammatic cross-section through a variant of such a device and likewise in accordance with the invention.
Figure 5:
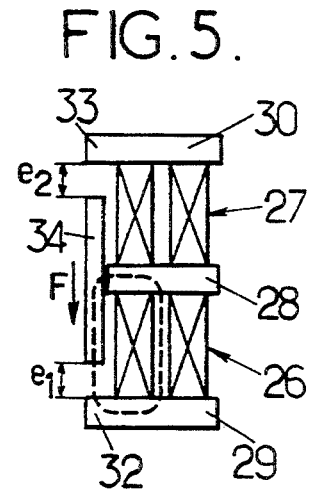
FIG. 5 is a developed section of FIG. 4 on cylindrical surface V—V.

This applies to the two variants shown diagrammatically respectively in FIG. 3 and in FIGS. 4 and 5.

In each of these two variants, the two electromagnets (referenced in this case 26 and 27) are juxtaposed angularly relative to the axis X along a circular arc centered on said axis, with a plate 28 of ferromagnetic material being interposed therebetween, the ends of the two electromagnets furthest from the intermediate plate 28 themselves being juxtaposed against overhanging plates of ferromagnetic material 29 and 30 which project in a direction explained below.

The assembly constituted by the two electromagnets 26 and 27 and the three plates 28, 29, and 30 forms a stationary U-shaped assembly that is disposed around a tab 31 of ferromagnetic material secured to the shutter 11, leaving gaps $e_1$ and $e_2$ between the angular ends of said tab 31 and the overhanging portions or "heels" 32 and 33 of the plates 29 and 30.

In the embodiment of FIG. 3, the tab 31 is in the form of a cylindrical arc of the same kind as the above-mentioned cylindrical arcs 12, but extending over a greater angular, and made of ferromagnetic material, while the assembly 26–30 is disposed radially outside said tab.

In FIG. 3, dashed lines show the circuit followed by the magnetic field generated when the electromagnet 26 is excited, which excitation has the effect of urging the tab 31 angularly in the direction of arrow F, thereby reducing the size of gap ex until it is eliminated by the tab 31 coming into abutment against the facing heel 33.

Naturally, in this case also, a spring (not shown) constantly urges the tab 31 towards its middle angular position between the two heels 32 and 33, and the effect of electrically exciting the electromagnet 27 is to urge the tab 31 in the direction opposite to that described above.

In the embodiment of FIGS. 4 and 5, the tab of ferromagnetic material is constituted by a flat radial extension 34 in the form of a circular sector of a flat disk constituting the shutter and designated in this case by reference 35, and the U-shaped assembly constituted by the two electromagnets 26 and 27 and the three plates 28, 29, and 31 is disposed so as to overlie the tab 34 axially, said assembly extending over a circular arc centered on the axis X as can be clearly be seen in FIG. 4.

Here again, operation is identical to that described above with reference to the gaps $e_1$ and $e_2$, the arrow F, and the heels 32 and 33.

In the latter variant, the constricted passages to be selectively closed open out axially into one of the plane faces of the disk 35, and the disk is itself directly perforated by slots suitable for being placed in register with said openings in one of the extreme angular positions of the tab 34, and for one only of said two positions.

Other dispositions may be provided to facilitate displacement of the tab 34 within the gaps $e_1$ and $e_2$, e.g. by giving it a special profile, in particular by causing the edges of the tab 34 that delimit said gaps to be pointed and also by causing the heels 32 and 33 for co-operating with said edges to be pointed.

From which it can be seen that, regardless of the embodiments used, a hydraulic antivibration device of the adaptative type is obtained whose structure and operation can be seen clearly from the above.

Compared with previously known devices, the present adaptative device presents the two following major advantages:

it is no more bulky than comparable conventional devices that are not adaptative; and it implements a "high frequency decoupling" effect at times when such an effect is beneficial, with said effect being automatically eliminated at other times.

The first of these two advantages results from the fact that the set of two electromagnets can be housed completely inside a portion of the peripheral ring that usually constitutes the outer portion of the rigid intermediate partition 7, i.e. a portion in which the constricted passages are hollowed out.

To obtain a clear idea by way of purely illustrative and naturally non-limiting example of the invention, the ring in question is defined by a circular inner cylinder of diameter lying in the range 40 mm to 80 mm and by a circular outer cylinder of diameter lying in the range 80 mm to 120 mm.

Figure 6:
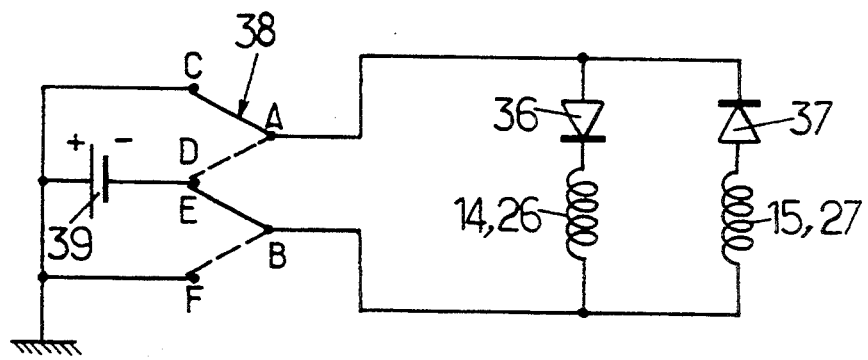
FIG. 6 is an advantageous electrical power supply circuit suitable for use in the invention.

The two coils 14, 15 or 26, 27 are advantageously excited by means of the circuit given in FIG. 6.

In this circuit, each of the two coils 14, 26 or 15, 27 is connected in series with a rectifier 36, 37 (diode or the like), with the directions of forward conduction of said two rectifiers being opposite and with the two assemblies each constituted by one of the coils and one of the rectifiers connected in series therewith themselves being connected in parallel between the common terminals A and B of a double reversing switch 38 whose other terminals C, D, E, and F are connected together in pairs and in opposite order to the two poles of a DC source 39, e.g. the battery of the vehicle in question.

Naturally, and as can be seen from the above, the invention is not limited in any way to the particular applications and embodiments that have been described in detail; on the contrary, it extends to all variants thereof.

I claim:

1. A hydraulic antivibration device comprising a rigid strength member (1) that is annular about an axis X, a rigid stud (3) coaxial with said strength member, an annular elastomer wall (5) about the axis X and capable of withstanding axial compression interposed between the strength member and the stud, a flexible and liquid-tight bellows (6) carried by the strength member and co-operating with the strength member, the stud, and the annular wall to define an enclosure, a rigid intermediate partition (7) carried by the strength member and subdividing the inside of the enclosure into two chambers, a working chamber (A) adjacent to the wall, and a compensation chamber (B) adjacent to the bellows, two passages of different size sections (8, 10) putting the two chambers into communication with each other, a mass of liquid filling the two chambers and the passages, a shutter (11) that is rotary about the axis X and that is suitable for opening or closing at will at least the passage (10) of larger section, a tab of ferromagnetic material (16, 31, 34) that forms a portion of the rotary shutter and that is eccentric relative to the axis X, electromagnetic means housed in the periphery of the rigid intermediate partition (7) and disposed to act angularly on the tab in one direction about the axis X, resilient means (17) urging said tab angularly in the opposite direction, and slots (19) formed through the rotary shutter and suitable for co-operating with slots (20, 21) formed through the intermediate partition in such a manner as to put both chambers into communication with a decoupling valve member (22) centered on the axis X and mounted to move within the intermediate partition, the antivibration device being characterized in that the electromagnetic means comprise two small electromagnets (14, 26; 15, 27) eccentric relative to the axis X, and two magnetic circuits that are looped by the tab (16, 31, 34) via two respective gaps ($e_1$, $e_2$) disposed angularly on either side of said tab, in that the resilient means (17) are disposed to urge the tab constantly towards a middle angular position in which the widths of the two gaps are equal, and in that the slots (19) formed through the shutter are disposed in such a manner that the above communication with the decoupling valve member (22) is established while the larger section passage is closed, and, on the contrary, is interrupted when said passage is opened.

2. A device according to claim 1, characterized in that the annular wall (5) is generally frustoconical in appearance.

3. A device according to claim 1, characterized in that the two electromagnets (26, 27) are angularly juxtaposed one against the other with an interposed plate of ferromagnetic material (28), and in that the end of each electromagnet furthest from the other electromagnet is juxtaposed with a respective end plate of ferromagnetic material (28, 29) that overhangs slightly in such a manner that the assembly comprising the electromagnets and the plates forms a U-shape encompassing the tab (31, 34), the gaps being located between said tab and the legs of the U-shape as embodied by the overhanging portions (32, 33) of the end plates.

4. A device according to claim 3, characterized in that the rotary shutter (11) is a disk that is extended at its periphery by a cylindrical rim including at least one shutter member (12, $12_1$) suitable for moving past an opening (13) of one of the passages (8, 10) hollowed out in the periphery of the intermediate partition (7), and in that the tab of ferromagnetic material is constituted by a cylindrically arcuate portion (31) fitted to an edge of the disk.

5. A device according to claim 3, characterized in that the rotary shutter is a disk (35) having at least one slot formed therein suitable for passing over an opening of one of the constricted passages, and in that the tab of ferromagnetic material is a flat radial extension (34) of said disk and in the form of a circular section.

6. A device according to claim 3, characterized in that an angular extent of the tab (31, 34) lies in the range 60° to 90°.

7. A device according to claim 3, characterized in that the set of electromagnetic means is located between two circular cylinders about the axis X having respective diameters lying in the range 40 mm to 80 mm and in the range 80 mm to 120 mm.

8. A device according to any preceding claim 3, characterized in that coils of the two electromagnets (14, 26; 15, 27) are connected in series with respective rectifiers (36, 37) and in that they are fed with electricity from a DC source (39) via a double reversing switch (38).

* * * * *

UNITED STATES PATENT AND TRADEMARK OFFICE
CERTIFICATE OF CORRECTION

PATENT NO. : 5,411,243
DATED : May 2, 1995
INVENTOR(S) : Andre Gennesseaux

It is certified that error appears in the above-indentified patent and that said Letters Patent is hereby corrected as shown below:

On the cover page of the patent, left hand column, please change the designation of the Assignee to read as follows:

[73] Assignee: HUTCHINSON, Paris, France

Signed and Sealed this

Twenty-second Day of August, 1995

Attest:

BRUCE LEHMAN

Attesting Officer  Commissioner of Patents and Trademarks